United States Patent
Giftthaler et al.

(10) Patent No.: US 12,498,737 B2
(45) Date of Patent: Dec. 16, 2025

(54) ONLINE SPEED OVERRIDE OF A TRAJECTORY

(71) Applicant: Intrinsic Innovation LLC, Mountain View, CA (US)

(72) Inventors: Markus Giftthaler, Freising (DE); Andre Gaschler, Munich (DE); Giovanni Sutanto, Sunnyvale, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 207 days.

(21) Appl. No.: 18/534,461

(22) Filed: Dec. 8, 2023

(65) Prior Publication Data
US 2024/0219927 A1 Jul. 4, 2024

Related U.S. Application Data

(60) Provisional application No. 63/435,880, filed on Dec. 29, 2022.

(51) Int. Cl.
*G05D 1/65* (2024.01)
*G05D 1/646* (2024.01)
(Continued)

(52) U.S. Cl.
CPC .............. *G05D 1/65* (2024.01); *G05D 1/646* (2024.01); *G05D 2107/70* (2024.01); *G05D 2109/10* (2024.01)

(58) Field of Classification Search
CPC ...... G05D 1/65; G05D 1/646; G05D 2107/70; G05D 2109/10; G05D 1/229; G05D 2105/28; B25J 9/1664
See application file for complete search history.

(56) References Cited

U.S. PATENT DOCUMENTS 11,833,680 B2 * 12/2023 Deits .................. G05D 1/249
2002/0091460 A1 * 7/2002 Allen ................ G05B 19/4166
700/173
(Continued)

FOREIGN PATENT DOCUMENTS

CN 109991934 7/2019
WO WO 2019041657 3/2019

*Primary Examiner* — Thomas Ingram
(74) *Attorney, Agent, or Firm* — Fish & Richardson P.C.

(57) ABSTRACT

Methods, systems, and apparatus, including computer programs encoded on computer storage media, for overriding an original motion of a robot along a trajectory. The method includes initiating, by a real-time robotics control system, execution of an input trajectory for a robot at a default speed, wherein the input trajectory is a time-parameterized trajectory and specifies a path in an operating environment; before completing execution of the input trajectory, receiving a user input specifying a value of an online speed override factor; in response, generating a phase-parameterized version of the input trajectory using a phase variable; computing, on each real-time control cycle, a target velocity and a target acceleration of the phase-parameterized version of the input trajectory based on the online speed override factor; and causing the robot to transition to the target velocity and the target acceleration while traversing the path in the operating environment.

20 Claims, 3 Drawing Sheets

(51) Int. Cl.
  *G05D 107/70* (2024.01)
  *G05D 109/10* (2024.01)

(56) References Cited

U.S. PATENT DOCUMENTS

| | | | |
|---|---|---|---|
| 2011/0208356 A1* | 8/2011 | Kato | B25J 9/163 |
| | | | 700/253 |
| 2022/0011775 A1* | 1/2022 | Zhu | G05D 1/227 |
| 2022/0371194 A1* | 11/2022 | Van Duijkeren | B25J 9/163 |
| 2023/0302636 A1* | 9/2023 | Wang | B25J 9/1664 |

* cited by examiner

ONLINE SPEED OVERRIDE OF A TRAJECTORY

CROSS-REFERENCE TO RELATED APPLICATIONS

This application claims priority to U.S. Provisional Application No. 63/435,880, filed on Dec. 29, 2022. The disclosure of the prior application is considered part of and is incorporated by reference in the disclosure of this application.

BACKGROUND

This specification relates to robotics, and, more particularly, to speed overriding of a robot traversing along a trajectory determined for a robot in a robotic system.

Robotic manipulation tasks often rely heavily on sensor data in order to complete the task. Sensor data generally capture a state of an environment in which a robotic system performs corresponding tasks. A robotic system can, using sensor data, determine a trajectory for the movement of a robot of multiple robots in the environment to perform a task. For example, by following a determined trajectory, a warehouse robot that moves boxes can be programmed to use camera data to pick up a box at the entrance of a warehouse, move it, and put it down in a target zone of the warehouse. For another example, by following another trajectory, a construction robot can be programmed to use camera data to pick up a beam and put it down onto a bridge deck.

SUMMARY

This specification describes techniques related to speed overriding of a robot traversing a trajectory defined for the robot in a robotic system. More specifically, the described techniques allow a user to specify a value for an online speed override factor for at least a segment of the trajectory. The described techniques generate a phase-parameterized version of the trajectory using a phase variable. Using the phase-parameterized version of the trajectory and the value for the online speed override, the described techniques determine a target motion with a target velocity and a target acceleration for the robot so that the robot transitions from the current motion into the target motion to traverse at least the segment of the trajectory. In some implementations, the described techniques receive multiple values for the online speed override factor for different segments of the trajectory and determine target motions for the robot to traverse the different segments using the received multiple values.

Other implementations of this aspect include corresponding apparatus, systems, and computer programs, configured to perform the aspects of the methods, encoded on computer storage devices.

Particular embodiments of the subject matter described in this specification can be implemented to realize one or more of the following advantages. First, the method and system can robustly adjust a motion for a robot to traverse along a particular segment of a trajectory. More specifically, the described techniques can efficiently formulate the speed override program as a one-dimensional problem that can be solved in real time, and the obtained solutions to the problem satisfy one or more motion constraints. Thus, the described techniques improve the efficiency for generating the speed override and also improve the efficiency for visually inspecting the accuracy of a robot traversing the segment in "slow motion." More specifically, the method and system allows a robot to slow down the motion only when traversing along a segment of interest in the trajectory, and causes the robot to return to regular motions pre-planned for the rest of the trajectory instead of slowing down the robotic motion for the entire trajectory. For example, for a trajectory determined for a robot to weld a first component to a second component at a corner of the first component, the system allows a technician to inspect the motion of the robot (and optionally, its relevant components) in "slow motion" when the robot traverses the corner portion of the trajectory. This way, the technician can check, in "slow motion," whether the orientation of the robot is in a state as planned (e.g., the state of a welding tooltip of the robot), and maintain or increase the motion speed for the robot to traverse the rest of trajectory. Accordingly, the entire inspection process is accelerated with motion limits being satisfied.

In addition, the implemented techniques can cause the robot to traverse the trajectory accurately even though the motion of the robot is changed for different segments of the trajectory. This is because the implemented techniques can ensure that the robot reaches positions that are identical to the initial trajectory.

Furthermore, the override motions for the robot are deterministic and repeatable for the same robot traversing the same initial trajectory. In other words, if a robot traverses the same trajectory twice using the same values for the online speed override factor(s), the method and the system generate the same motion plan for the robot to traverse the same trajectory. The motion plan includes an overall trajectory time, one or more target velocities, one or more target accelerations, and the same path defined by the trajectory.

Moreover, the implemented techniques can determine target motions for a robot online at a real-time scale; therefore, the motion and trajectory of the robot can be evaluated directly in a robot control loop. Furthermore, the method and system ensure the motion transition (e.g., the robot speed slows down or accelerates into target velocities and accelerations) is performed in the most efficient manner within the shortest possible time, subject to system constraints.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The described techniques generally relate to determining a motion override for a robot to traverse at least a portion of a trajectory. The trajectory is pre-determined for the robot so that when the robot traverses along the trajectory, the robot performs operations to achieve one or more tasks. The motion override includes at least a target velocity and a target acceleration for the robot to transition to from a current velocity and acceleration.

Unlike conventional techniques, the techniques described in this document can specify one or more segments of a trajectory to override a predetermined motion for a robot. For example, the system can override an initial motion to a first target motion for a robot to traverse along a first segment of the trajectory, and override the initial motion to a second target motion for the robot to traverse along a second segment of the trajectory. This way, the techniques can improve the efficiency for motion inspection by determining different target motions for the robot to traverse along different segments.

Unlike the naïve time scaling techniques, where a system simply stretches the sampling time of a trajectory by a velocity scaling factor, the described techniques modulate the trajectory phase smoothly using a phase variable. By using the phase variable to convert the trajectory from a real-time function into a phase-parameterized version of the trajectory (or a sequence of piecewise splines mimicking the trajectory), the phase parameterization does not introduce additional accelerations or jerks on the trajectory, which the naive time scaling techniques do and could introduce a high risk of violating physical limits of the robotic components (e.g., velocity, or acceleration limits, or both of a motor, an engine, or a joint). In contrast, phase parameterization can keep the target motions within the physical limits. In addition, since the phase parameterization implements modulation functions of second-order continuously differentiable within the physical limits, the phase-parameterized version of the trajectory is smoothed and allows the system and method to determine target velocities and accelerations from the phase-parameterized trajectory.

To generate the phase-parameterized trajectory, the described techniques receive a user input specifying one or more values of the online speed override factors. Each factor is used to parameterize a segment of the trajectory for the robot to traverse. The described techniques can implement an online trajectory generator to compute a target motion in real time using the one or more factor values. The algorithms underlying the techniques can ensure the target motion satisfies physical limits or criteria (e.g., upper and lower bounds for velocities, accelerations, and, optionally, jerks) of the robotic system.

Figure 1:
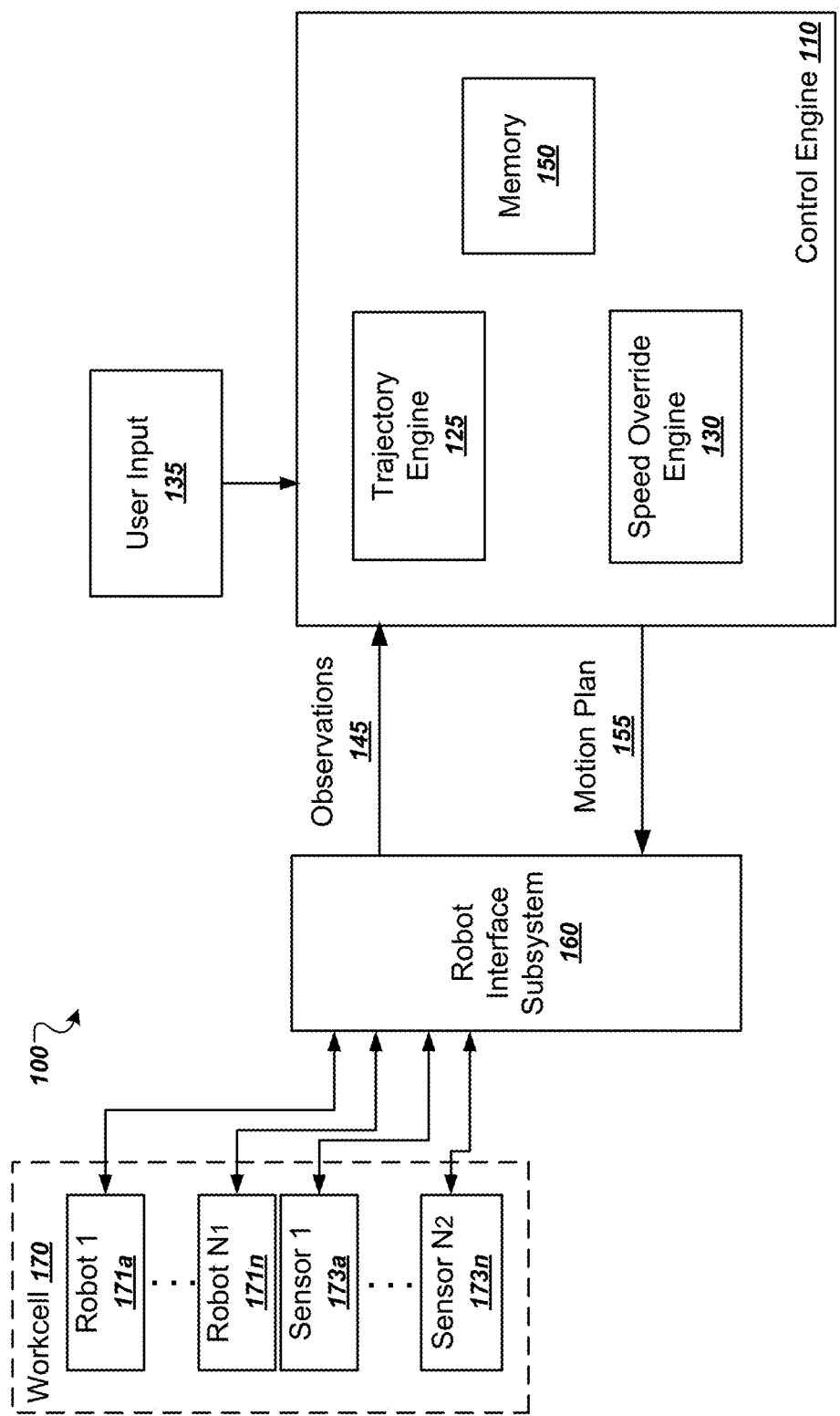
FIG. 1 illustrates an example of a schematic representation of the system.

FIG. 1 illustrates an example of a schematic representation of the system 100. The system 100 is configured to override current motions by target motions for a robot to traverse along at least a portion of a trajectory. The trajectory is determined for the robot to perform respective tasks when the robot traverses along the trajectory. The example system 100 is a system implemented on one or more computers in one or more locations, in which systems, components, and techniques described below can be implemented. Some of the components of the system 100 can be implemented as computer programs configured to run on one or more computers. The control engine 110 can include any suitable engines or algorithms configured to generate motion plans 155 after processing corresponding input data.

The term "trajectory" used throughout this document generally refers to a path that a robot traverses, along which the robot can perform operations to achieve one or more tasks. To traverse the trajectory, the robot follows a predetermined motion plan. The motion plan can be determined by a system based on a status of a working environment. The term "motion plan" generally refers to a sequence of actions or movements operated by the robot at different time steps driven by corresponding driving mechanisms (e.g., motors, engines, shafts, gears, and other driving components). In some cases, each action in a motion plan specifies a target acceleration, a target velocity, a target jerk, or other kinematics quantities. In some cases, the motion plan can further include data specifying positions and orientations for the robot at different time steps. Positions, orientations, and kinematics quantities are different aspects of a "kinematics state" or "state" of a robot. The term "working environment" generally refers to an environment where one or more robots are performing actions along different trajectories following their respective motion plans to achieve goals. A working environment can include a physical operating environment, e.g., a robot workcell 170 in FIG. 1, or a virtual operating environment, e.g., a virtual environment simulated by engines or processors included in a system.

As shown in FIG. 1, the system 100 includes a workcell 170, in which multiple robots 171a-n are programmed to traverse respective trajectories to perform tasks. The workcell 170 can further include multiple sensors 173a-n configured to collect data representing the status of multiple components (e.g., robots, objects, or other components) and the workcell 170.

The sensor data collected by the multiple sensors 173a-n are temporarily collected and stored in the robot interface subsystem 160, which then processes the sensor data to generate data representing observations 145. The observations 145 are then transmitted to a control engine 110. In some implementations, the robot interface subsystem 160 provides the collected sensor data as the observations 145 to the control engine 110 without processing. The term "observation" generally refers to the determined or observed status of an operating environment and the states of multiple components in the operating environment. Example observations can include a state (e.g., dynamic quantities, the position, and the orientation) of a robot or a component (e.g., a tooltip) of a robot, of an object or a component of an object, a change of states of components or a change in the number, state, type of components in the environment, or other suitable observations.

The control engine 110 in the system 100 is configured to generate one or more motion plans 155 given the observations 145 and the user input 135. The motion plan 155 can include data specifying particular poses for causing robots to move at different time steps, for example, a sequence of tasks for a robot or robotic components to follow during a particular time period so that the robot or robotic components can perform a predetermined task following a predetermined path. As a particular implementation in this specification, the motion plan 155 can include data specifying, at an initial time step, a sequence of actions for a robot to traverse a trajectory, and data specifying, at a subsequent time step, a sequence of actions for a robot to transition from the initial motion into a target motion to traverse at least a portion of the trajectory. The target motion includes multiple target kinematics such as a target velocity, a target acceleration, and optionally, a target jerk.

The control engine 110 includes a trajectory engine 125 configured to determine a trajectory based on user input 135 and the observations. The trajectory engine 125 can also determine a motion plan for a robot to traverse the trajectory. By traversing the trajectory and moving following the motion plan, the corresponding robot can perform one or more tasks to achieve a goal.

The user input 135 for generating a trajectory by the trajectory engine 125 can include data specifying a time period for performing a task or traversing a trajectory, a predetermined size, shape, geometry of a trajectory, a predetermined range for the distance of a trajectory, one or more key actions for a robot to perform traversing a trajectory, one or more orientations of a one or more components of a robot at different time steps when the robot traverses a trajectory. Based on the user input 135 and the observations 145, the trajectory engine 125 can generate a trajectory that allows the robot to perform assigned tasks in a current status of the working environment.

The trajectories and motion plans determined by the trajectory engine 125 are ideally not conflicting with one another, e.g., a first robot traversing a first trajectory would not collide with a second robot traversing a second trajectory at any time when traversing the two trajectories. The determined trajectories are ideally accurate and efficient for robots to traverse, and the determined motion plans are ideally accurate and efficient so that robots can rigorously traverse the trajectories with suitable motions. For example, the kinematics quantities specified for a robot in a motion plan to traverse a predetermined trajectory should satisfy one or more motion limits, or safety criteria, or both. The motion limits for a robot can include a lower bound velocity and an upper bound velocity, a lower bound acceleration and an upper bound acceleration, or a lower bound jerk and an upper bound jerk, that are achievable by a driving mechanism in the robot or the system. The safety criteria can include the maximum force or torque applied to a robot or a component of the robot when the robot is transitioning into a target motion. Considering the forces and torques are related to accelerations of a motion, the term "motion limits" and "safety criteria" are also referred to as "bounds," "limits," or "criteria," and used interchangeably in the following description for simplicity.

However, the determined trajectory and corresponding motion plans might have accuracy issues. For example, a trajectory for a first robot might conflict with another one even though the trajectory engine 125 determines the trajectories do not conflict. As another example, a motion plan for a robot to traverse a trajectory might not cause the robot to rigorously traverse the trajectory even though the trajectory engine 125 determines the motion plan will cause the robot to traverse the trajectory accurately. In fact, when following an "inaccurate" motion plan, the robot might traverse a path different from the determined trajectory, or traverse the trajectory with inaccurate kinematics quantities (e.g., velocities, accelerations, or jerks), or both, such that the robot cannot successfully perform the assigned task(s).

The system 100 (or equivalently, the control engine 110) facilitates the process of inspecting whether the trajectory, or the motion plan for the trajectory, or both, are accurately determined by the trajectory engine 125 for a corresponding robot. More specifically, the system 100 can scale up and down the motions (e.g., velocities, accelerations, or jerks) for a robot when the robot traverses different segments of the trajectory, so that the robot can move slowly as if being inspected in the "slow motion" mode for segment(s) of interest, and move fast for other segments. The term "scale" is also referred to as "override" since the system 100 overrides the original motion plan with original kinematics quantities into target ones.

To "override" the original motion plant for the trajectory for inspection, a speed override engine 130 included in the control engine 110 first generates a phase-parameterized trajectory for the input trajectory received from the trajectory engine 125. To generate a phase-parameterized trajectory, the speed override engine modifies the input trajectory from a function of real time into a function of trajectory time using a phase variable. The term "real-time" generally refers to the clock time, which is universal and cannot be stopped, accelerated, or slowed down. The term "trajectory time" generally refers to a time scalable for a robot to traverse along a segment of the trajectory. The details of generating a phase-parameterized version of the input trajectory are described in connection with FIG. 2.

The speed override engine 130 further receives data from the user input 135 that specifies a value for the online speed override factor, and based on the phase-parameterized version of the trajectory, the speed override engine 130 can determine a target motion for the robot for at least a segment of the input trajectory. The target motion can include a target velocity, a target acceleration, or a target jerk. These target kinematics quantities can be greater than, equal to, or less than the original kinematics quantities specified in the original motion plan for the input trajectory. In some implementations, the speed override engine 130 can receive multiple values for the online speed override factor for different segments of the phase-parameterized version of the trajectory. Each factor value can be used to determine a respective target motion for a respective segment of the trajectory. The details of determining the target motions using different values of the online speed override factor are described in connection with FIG. 2.

After determining the target motion, the speed override engine 130 can generate a target motion plan for overriding the original motion by the target motion for a robot to traverse the input trajectory. The target motion plan ensures that a robot traverses the same input trajectory without error. This way, the robot can be instructed to transition from an original motion plan into a target motion plan having different kinematics quantities configurations or requirements. Given the target motion can be determined to override only a segment of the input trajectory, the system can avoid slowing down the robot to traverse the entire trajectory. The inspection process is accordingly improved and facilitated.

The control engine 110 can further include a memory 150 to store data received or generated during the online process. For example, memory 150 can store data representing the observations 145 and the user input 135, input trajectories determined by the trajectory engine 125, data representing phase-parameterized trajectories and target motions or motion plans generated by the speed override engine 130, or other data.

The control engine 110 can provide the motion plan 155 to the robot interface subsystem 160, and the robot interface subsystem is configured to generate a set of instructions to drive one or more robots to move following the motion plan 155 along one or more trajectories. The motion plan 155 can include the original motion plans determined for initial trajectories generated by the trajectory engine 125, and target motion plans for overriding at least a portion of the original motion plans. In some implementations, the motion plan 155 includes a motion plan that has already been overridden by the speed override engine 130, so that the robot would traverse, following the overridden/target motion plan with target dynamics, along at least a segment of an input trajectory.

Figure 2:
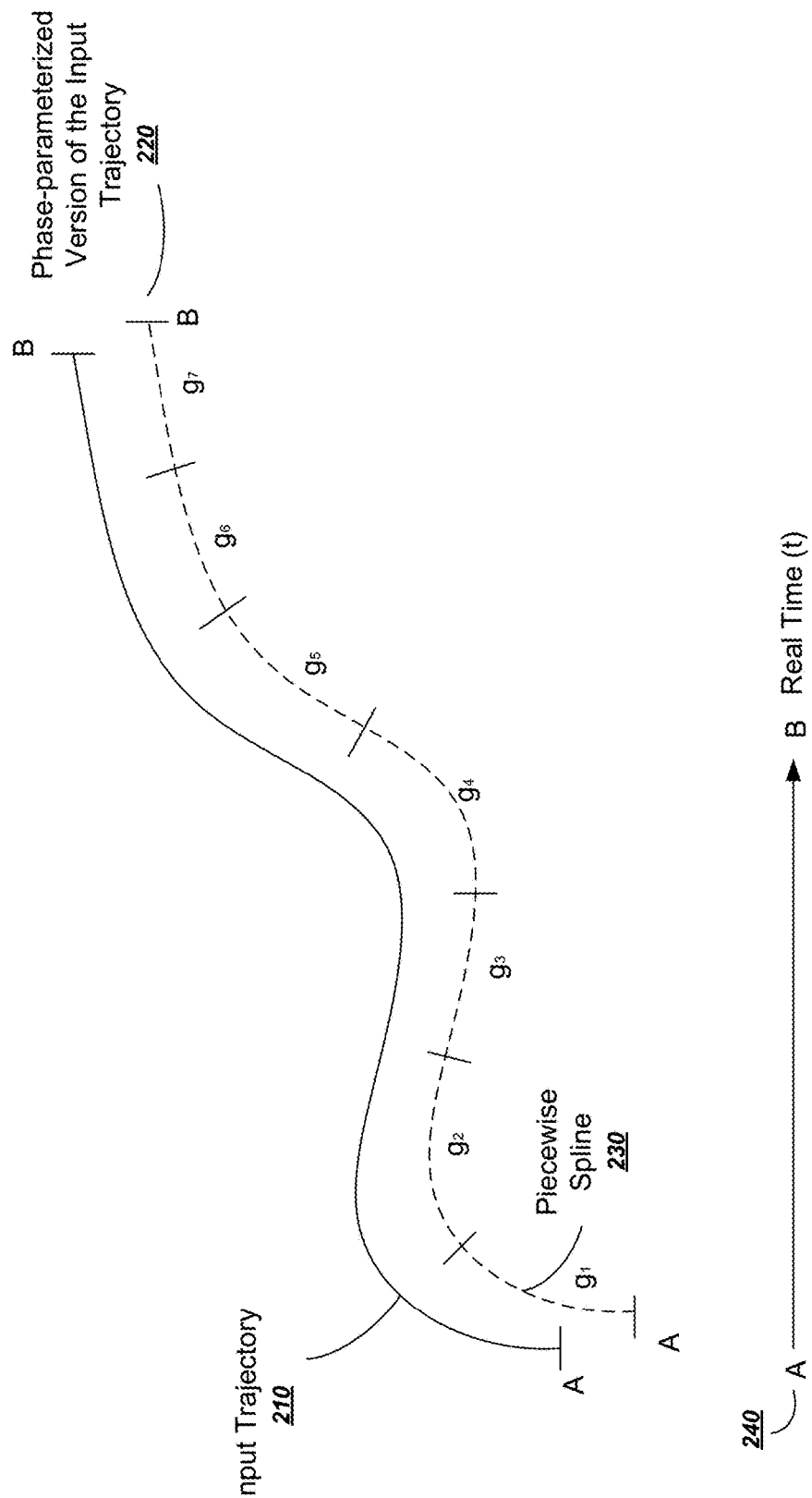
FIG. 2 illustrates an example of input trajectory and an example of phase-parameterized version of the input trajectory.

FIG. 2 illustrates an example of input trajectory 210 and an example of phase-parameterized version of the input trajectory 220. The example input trajectory 210 can be generated by a trajectory engine (e.g., trajectory engine 125 of FIG. 1) based on data representing observations and user input. The example of a phase-parameterized version of the input trajectory 220 can be generated by a speed override engine (e.g., speed override engine 130 of FIG. 1).

As shown in FIG. 2, the input trajectory 210 prescribes a path starting from point A to point B for a robot to traverse. The system can specify a particular motion plan that, when executed by the system, causes the robot to perform operations when traversing the trajectory 210. To override the motion plan for at least a segment of the trajectory 210, the system can generate a phase-parameterized version of the input trajectory 220 using a phase variable. One example algorithm is described as follows.

The phase variable can be expressed as $s(t) \in [0,1]$, which is a function of real time t. The input trajectory can be expressed as T, and the total duration of the input trajectory 210 for a robot to traverse can be expressed as D. The system can convert the phase variable s(t) into the trajectory time. Different from real time, trajectory time represents the time for a robot to traverse along a trajectory, which can be slowed down or even stopped. The variable of the trajectory time can be expressed as $$u = u_o + s(t)D. \qquad \text{Equation (1)}$$

Here, the term u represents the variable for trajectory time, and the term $u_o$ represents the initial trajectory time. The dynamics of the phase variable s includes a first-order time derivative of the phase, i.e., $\dot{s}$, and a second-order time derivative of the phase variable $\ddot{s}$. The first-order time derivative can be expressed as a function of an online speed override factor $\xi(t)$ as follows:

$$\dot{s} = \frac{ds}{dt} = \frac{\xi(t)}{D}, \qquad \text{Equation (2)}$$

where the online speed override factor $\xi(t)$ is a function of real time. The second-order time derivative can be obtained using the chain rule and expressed as follows:

$$\ddot{s} = \frac{d^2 s}{dt^2} = \frac{1}{D} \times \frac{d\xi}{dt} = \frac{1}{d} \times \dot{\xi}, \qquad \text{Equation (3)}$$

where the term $\dot{\xi}$ represents a first-order time derivative of the online speed override factor.

For a discrete time step $t_i$, where $i \in \{1, 2, 3, \ldots, N\}$, and the difference between each pair of two neighboring time steps is $\delta t$. The discrete trajectory time can be expressed as follows:

$$u_{i+1} = u_i + \frac{du}{ds} \times \frac{ds}{dt} \delta t = u_i + D \times \frac{\xi(t)}{D} \delta t = u_i + \zeta(t)\delta t. \qquad \text{Equation (4)}$$

Here, the term $\delta t$ can also refer to the real time granularity for controlling a motion of a robot for a real time control system. Or in other words, the term $\delta t$ is a real time control period. During the regular trajectory execution, i.e., a robot traverses a trajectory using the original motion plan determined for the trajectory, the online override speed factor $\xi(t)$ is a constant and $\xi(t)=1$. The Equation (4) can therefore be reduced as $u_{i+1}=u_i+\delta t$. In these situations, there is no distinction from the mathematics' perspective between the real time t and the trajectory time u. In other words, $u_i=t_i$ or $u(t)=t$.

For situations where the robot needs to take twice the time as the regular trajectory execution, the online override speed factor $\xi(t)$ can be set as a constant 0.5. In these cases, the discrete trajectory time can be expressed as $$u_{i+1} = u_i + \frac{1}{2}\delta t.$$

The trajectory time is scaled as half as the real time, and the trajectory time needed for a robot to traverse a trajectory is now twice as the time for the regular trajectory execution. In addition, for cases where the system overrides the original motion for a robot to traverse a trajectory to zero speed, i.e., fixing the robot from moving, the online speed override factor $\xi(t)$ can be set as zero. This way, Equation (4) is reduced as $u_{i+1}=u_i$, which represents the trajectory time is stopped and all motions associated with the robot are paused.

Furthermore, for situations where the online override speed factor $\xi(t)$ is not the constant one, the system needs to re-compute kinematics quantities (e.g., target velocities, accelerations, and optionally, jerks) based on derivatives of the phase-parameterized trajectory with respect to the phase variable s(t). In general, the system can generate the phase-parameterized trajectory using interpolation techniques and express the interpolated trajectory using the phase variable. One example interpolation technique can include a piecewise continuous polynomial spline (e.g., piecewise spline 230). The system can imitate the input trajectory using the spline as a function of the phase variable. In some implementations, the system can further implement multiple polynomial splines to imitate a sequence of segments in the phase-parameterized version of the input trajectory (e.g., 220). As shown in FIG. 2, the system can generate a sequence of piecewise splines $g_1, g_2, \ldots, g_7$ to imitate a respective segment of the phase-parameterized version of the input trajectory (e.g., 220). Since generating one phase-parameterized trajectory using a single spline is a special case for generating one phase-parameterized trajectory using a sequence of piecewise splines, the following document describes the phase-parameterization process in view of multiple splines for the ease of explanation.

For example for an input trajectory that originally needs time T for a robot to traverse using the initial motion plan, the system can parameterize the input trajectory using a sequence of piecewise continuous polynomial splines $\{g_1(\hat{u}_1), g_2(\hat{u}_2), g_3(\hat{u}_3), \ldots, g_n(\hat{u}_n)\}$. Each piecewise spline can be expressed as a fifth-order polynomial with six coefficients because each end of two ends of the spline has three scalars that need to be specified, e.g., the position, velocity, and acceleration. One example piecewise continuous polynomial spline can be expressed as:

$$g_i(\hat{u}_i) = \sum_{k=0}^{5} c_k(\hat{u}_i)^k = c_0 + c_1\hat{u}_i + c_2\hat{u}_i^2 + c_3\hat{u}_i^3 + c_4\hat{u}_i^4 + c_5\hat{u}_i^5, \qquad \text{Equation (5)}$$

where the term $\hat{u}_i$ represents the trajectory time for the robot to traverse the $i^{th}$ segment of the phase-parameterized trajectory. And the term $\hat{u}_i \in [0, \hat{D}_i]$, where $\hat{D}_i$ represents the total real time duration for a robot to traverse the $i^{th}$ segment of the input trajectory (or equivalently, the piecewise spline representing the $i^{th}$ segment of the phase-parameterized trajectory). For $u \in [0, D]$, $g_i$ is defined for $u \in [u_i, u_i+\hat{D}_i]$ with $\hat{u}_i = u - u_i$. By changing the variable from $\hat{u}_i$ to $u_i$, the piecewise continuous polynomial spline can be expressed as:

$$g_i(u) = \sum_{k=0}^{5} c_k (u - u_i)^k. \quad \text{Equation (6)}$$

By plugging the Equation (1) into Equation (6), and defining $\Delta u_i = u_i - u_o$, the expression can be rewritten as:

$$g_i(s) = \sum_{k=0}^{5} c_k (u_0 - u_n + s(t)D)^k = \quad \text{Equation (7)}$$
$$c_0 + c_1(s(t)D - \Delta u_i) + c_2(s(t)D - \Delta u_i)^2 +$$
$$c_3(s(t)D - \Delta u_i)^3 + c_4(s(t)D - \Delta u_i)^4 + c_5(s(t)D - \Delta u_i)^5.$$

The Equation (7) represents the phase-parameterized trajectory for the $i^{th}$ segment of the input trajectory, where each value $\Delta u_i$ determines a position of the phase-parameterized trajectory for the trajectory time $u_i$. The position of the phase-parameterized trajectory can be further used to determine a target velocity and a target acceleration for this position.

In general, the first-order derivative of the spline function $g_i(s)$ with respect to real time represents a target velocity, and the second-order derivative of the spline function $g_i(s)$ with respect to real time represents a target acceleration. The target velocity and acceleration are expressed as below:

$$\frac{\partial g_i}{\partial t} = \frac{\partial g_i}{\partial s} \times \frac{\partial s}{\partial t} = \xi(t) \sum_{k=1}^{5} k \times c_k \times (s(t)D - \Delta u_i)^{k-1}, \quad \text{Equation (8)}$$

$$\frac{\partial^2 g_i}{\partial t^2} = \frac{\partial^2 g_i}{\partial s^2} \times \left(\frac{\partial s}{\partial t}\right)^2 + \frac{\partial g_i}{\partial s} \times \frac{\partial^2 s}{\partial t^2} = \quad \text{Equation (9)}$$
$$\xi(t)^2 \sum_{k=2}^{5} k \times (k-1) \times c_k \times (s(t)D - \Delta u_i)^{k-2} +$$
$$\frac{d\xi(t)}{dt} \sum_{k=1}^{5} k \times c_k \times (s(t)D - \Delta u_i)^{k-1},$$

where equations (8) and (9) can be obtained using Equation (7) and the chain rule. For cases where the online speed override factor $\xi(t)$ is a constant for all t, the target velocity and acceleration can be expressed as:

$$\frac{\partial g_i}{\partial t} = \xi \sum_{k=1}^{5} k \times c_k \times (s(t)D - \Delta u_i)^{k-1},$$

$$\text{and } \frac{\partial^2 g_i}{\partial t^2} = \xi^2 \Sigma_{k=2}^{5} k \times (k-1) \times c_k \times (s(t)D - \Delta u_i)^{k-2}.$$

As described above, the system can receive user input specifying a value for the online speed override factor $\xi(t) = \bar{\xi} \in (0,1]$, the target velocity and acceleration for the $i^{th}$ segment of the phase-parameterized trajectory can be expressed as:

$$\frac{\partial g_i}{\partial t} = \bar{\xi} \sum_{k=1}^{5} k \times c_k \times (s(t)D - \Delta u_i)^{k-1}, \quad \text{Equation (10)}$$

$$\frac{\partial^2 g_i}{\partial t^2} = \bar{\xi}^2 \sum_{k=2}^{5} k \times (k-1) \times c_k \times (s(t)D - \Delta u_i)^{k-2}. \quad \text{Equation (11)}$$

In some cases, the system can receive multiple values for the online speed override factor from the user input, and each of the multiple values is assigned for a corresponding segment of the trajectory. The system can obtain a corresponding target velocity and acceleration for each segment using a corresponding value.

The system can further determine bounds for the online speed override factor and the first-order derivative of the online speed override factor with respect to real time t. For example, the system can obtain data representing a lower bound velocity $v_{min}$ and an upper bound velocity $v_{max}$ for the $i^{th}$ segment of the phase-parameterized trajectory. The system can ensure the target velocity satisfies the velocity range defined by the lower bound velocity and the upper bound velocity, i.e., $$v_{min} \leq \frac{\partial g_i}{\partial t} \leq v_{max}.$$

The expression can be rewritten as $v_{min} \leq \xi(t)\bar{v} \leq v_{max}$, where $$\bar{v} = \sum_{k=1}^{5} k \times c_k \times (s(t)D - \Delta u_i)^{k-1}$$

according to Equation 10. The permissible range for the online speed override factor $\xi(t)$ can be expressed as:

$$\frac{v_{min}}{\bar{v}} \leq \xi(t) \leq \frac{v_{max}}{\bar{v}}, \text{ if } \bar{v} > 0, \quad \text{Equation (12)}$$
$$\text{and } \frac{v_{max}}{\bar{v}} \leq \xi(t) \leq \frac{v_{min}}{\bar{v}}, \text{ if } \bar{v} < 0.$$

Similarly, to determine the bounds for the first-order derivative of the online speed override factor with respect to real time t, the system can receive data representing a lower bound acceleration $a_{min}$ and an upper bound acceleration $a_{max}$ for the $i^{th}$ segment of the phase-parameterized trajectory. The system can ensure that the first-order derivative of the online speed override factor stays within the range defined by the upper and lower bounds of the acceleration, i.e., $$a_{min} \leq \frac{\partial^2 g_i}{\partial t^2} \leq a_{max}.$$

The expression can be rewritten as $$a_{min} \leq \xi^2(t)\bar{a} + \frac{d\xi}{dt}\bar{v} \leq a_{max},$$

where $\bar{a} = \Sigma_{k=2}^{5} k \times (k-1) \times c_k \times (s(t)D - \Delta u_i)^{k-2}$ according to Equation 11. The permissible range for the first-order derivative of the online speed override factor $$\frac{\partial \xi(t)}{\partial t}$$

can be expressed as:

$$\frac{1}{\bar{v}}(a_{min} - \xi^2(t)\bar{a}) \leq \frac{\partial \xi(t)}{\partial t} \leq \frac{1}{\bar{v}}(a_{max} - \xi^2(t)\bar{a}), \text{ if } \bar{v} > 0, \quad \text{Equation (13)}$$

-continued $$\frac{1}{\bar{v}}(a_{max} - \xi^2(t)\bar{v}) \le \frac{\partial \xi(t)}{\partial t} \le \frac{1}{\bar{v}}(a_{max} - \xi^2(t)\bar{a}), \text{ if } \bar{v} < 0,$$

The above-noted equations (12) and (13) define a range of values for the online speed override factor and its first-order time derivative. Therefore, as long as the online speed override factor falls and its first-order time derivative into the permissible ranges, the determined velocity, and acceleration for overriding the motion of the original motion plan should automatically satisfy the motion limits. For example, if a value of the online speed override factor received from the user input falls in the permissible range specified by Equation (12), and a corresponding first-order time derivative of the online speed override factor falls into the permissible range defined by Equation (13), the system can accept the factor value and determine a target velocity and a target acceleration for a robot to transition to. The determined target velocity automatically falls in the range defined by the lower bound velocity and the upper bound velocity, and the determined target acceleration automatically falls in the range defined by the lower bound acceleration and the upper bound acceleration.

For cases where the user input specifies a value for the online speed override factor that falls outside the permissible range defined by Equation (12), e.g., greater than the upper bound of the online speed override factor, the system can, at each iteration step, iteratively increase a current factor value for a next iteration step to approach the user-specified factor value. To increase a current factor value, the system receives as input and processes the current value of the online speed override factor and the current value of the first-order time derivative of the online speed override factor to determine an updated factor value and an updated first-order time derivative for the next iteration step. The updated values approach the user-specified factor value. The system eventually obtains the max possible value for the online speed override factor, which may still be smaller than the user-specified factor value. The system stops the iteration process once the factor value at an iteration step reaches the upper bound of the permissible range.

In some implementations, the system can generate a notification to be displayed on a user interface when the received user input specifies a value of the online speed override factor that is beyond the permissible range specified by Equation (12). The notification can indicate that the user-specified override factor is not acceptable because it will cause the target motion to violate the motion limits or safety criterion. The user interface can be further configured to request a new value for the online speed override factor as an input.

Figure 3:
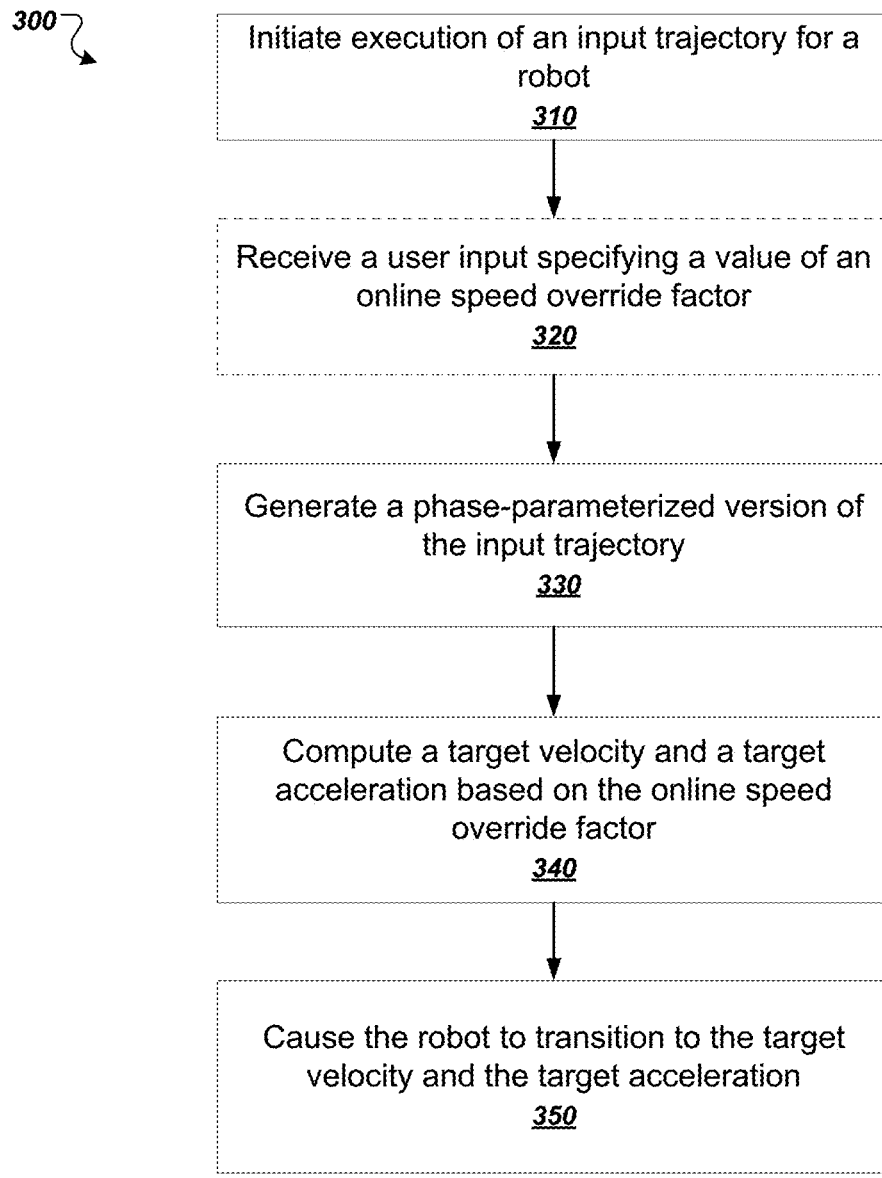
FIG. 3 illustrates an example process of overriding a motion for a robot to traverse a trajectory.

FIG. 3 illustrates an example process 300 of overriding a motion for a robot to traverse a trajectory. For convenience, the process can be performed by a real-time robotics control system of one or more computers located in one or more locations. For example, a system 100 of FIG. 1, appropriately programmed, can perform the process 300.

The system is a real-time robotics control system in the sense that the system can control the motion of a robotic system in real time. More specifically, the system can obtain or generate an initial motion plan, and generate instructions that, when executed, cause a robot to move (e.g., traverse a trajectory) according to the motion plan. The system can adjust the initial motion plan online real time. In other words, the system can adjust or override the initial motion plan when a robot is performing operations following the initial motion plan. The real-time control system can determine the override based on real time observations of an operating environment or component states in the operating environment. The real-time control system can also update or override the initial motion plan based on user input received in real time.

The system initiates execution of an input trajectory for a robot at a default speed (310). The system can include a control engine to determine the input trajectory or receive a predetermined trajectory from a memory unit. The default speed is also referred to as an original motion plan including an original velocity and an original acceleration. The default speed or the original motion plan is specified by data of a motion plan generated for the input trajectory. The system initiates the execution of the input trajectory by transmitting data including the original motion plan and the input trajectory to a robot interface subsystem, which is configured to generate instructions that, once executed, cause the robot to traverse the input trajectory at the default speed.

The input trajectory is a time-parameterized trajectory and specifies a path in an operating environment. More specifically, the input trajectory is a function of real time, and the trajectory defines a path that a robot should traverse to perform one or more tasks.

Before the system completes the execution of the input trajectory, the system receives a user input from a user interface (320). The user input specifies a value of an online speed override factor. As described above, the user input can include multiple values for the online speed override factor, and each value corresponds to a respective segment of the input trajectory.

In response to receiving the user input, the system generates a phase-parameterized version of the input trajectory using a phase variable (330). As described above, the system can generate a phase-parameterized trajectory for the input trajectory using a phase parameter s(t), which is a function of real time. To generate the phase-parameterized trajectory, the system can perform one or more interpolation techniques to imitate the input trajectory. In some cases, the system can generate a sequence of piecewise continuous splines for the input trajectory, each spline being a polynomial spline of the phase variable. For example, the system can use piecewise continuous polynomial splines to imitate one or more segments of the input trajectory. Moreover, the online speed override factor is a function of a first-order time derivative of the phase variable, as described in Equation (2).

By changing the parameters from a real-time parameter into a trajectory time parameter using the phase variable, the system obtains the phase-parametrized trajectory. The phase-parameterized trajectory can include a sequence of spline functions using the phase variable. The trajectory time variable represents a time period for a robot to travel along a segment of the phase-parameterized trajectory, which is different from the real time needed for a robot to travel the segment with the original motion plan (e.g., by default speed). In addition, the trajectory time variable is a function of the phase variable and is scalable. For example, the trajectory time variable can be slowed down if a slow motion inspection for a robot to traverse a trajectory is needed. As another example, the trajectory time variable can be stopped when the online speed override factor is set to zero, where the target motion for a robot is fixed or paused. That said, the trajectory time variable and the real time are interchangeable. For example, the trajectory time variable becomes equivalent to a corresponding real time when the value of the online speed override factor is set to one.

For each real-time control cycle, the system computes a target velocity and a target acceleration of the phase-parameterized version of the input trajectory based on the online speed override factor (340). More specifically, for discrete time steps, the system can determine a target motion for each time step. A target motion for a time step can include a target velocity and a target acceleration for a robot to traverse a portion of the trajectory within the time step. The target velocity and acceleration for a time step can be obtained by taking the first-order time derivative and the second-order time derivative of the piecewise spline at the time step, respectively. The details of computing a target velocity and a target acceleration are described above in connection with FIG. 2.

After obtaining the target motion plan, the system generates instructions that, once executed, cause the robot to transition to the target velocity and the target acceleration for the time step to traverse the path defined by the trajectory in the operating system (350).

In general, the system can determine a target motion for each real time control cycle. But in some cases, the system can determine a target motion for one segment of the input trajectory if the target motion is constant and consistent. Also, the system can determine, for each segment of multiple segments in the input trajectory, a target motion based on a respective override factor value. For example, the system can receive a first value of the online speed override factor and apply the first factor value to a first segment of the input trajectory. The system receives a second value of the online speed override factor and applies the second factor value to a second segment of the input trajectory. The system can determine respective target motions for the two segments using the first and second factor value respectively.

It should be appreciated that steps 310-350 are operations performed by the system in some situations where the system can override robotic motion upon receiving a value of an online speed override factor. In other situations, step 320 can be optional for overriding a robot motion. More specifically, the system can determine an override motion for the robot before receiving a user-specified override factor value or even without receiving a user-specified override value.

For example, after receiving an input trajectory for a robot and before generating instructions that instruct the robot to traverse the input trajectory, the system can generate the phase-parameterized version of the input trajectory using a phase parameter. The input trajectory is defined by a motion plan, which also specifies initial kinematics for the robot to traverse the input trajectory. The system can determine a range of possible velocities and accelerations for overriding the initial kinematics of the robot according to Equations (12) and (13) as described above. The system can further determine a target velocity and a target acceleration from the range of possible velocities and accelerations to replace the initial kinematics for the robot to traverse the input trajectory.

To determine the target velocity and the target acceleration, the system can select one velocity and one acceleration from the multiple possible velocities and accelerations according to different override requirements. Alternatively, the system can receive a user input specifying a value for the online speed override factor, and select a target velocity and a target acceleration that correspond to the override factor value. If the system determines that no possible velocity, or possible target acceleration, or both can correspond to the user-specified override value, the system can, in some cases, generate a notification to be displayed on a user interface for another value of the online speed override factor. In some other cases, the system can automatically select one velocity and one acceleration from the multiple possible velocities and accelerations according to different override requirements without requesting a new override factor value from the user.

In some implementations, the system can include a preview functionality. A user can select an override factor value from a set of predetermined override factor values and simulate a virtual robot traversing a motion plan with kinematics generated based on the selected override factor value. In this way, the user can examine whether the "slow motion" override is set correctly before implementing the override motion for controlling a corresponding physical robot.

In some implementations, the system can further include a safety module or control system to perform safety controls of the override motion. For example, the safety control system can identify a critical state from sensor data. In response, the safety control system can instruct the robot to "freeze" or move along a modified trajectory. One example critical situation can be when a person accidentally enters the region where the trajectory occupies. Another example critical situation can be when the robot deviates from a predetermined state at a time point when traversing the trajectory.

To ensure the safety and efficiency of the speed override process, the system can determine a permissible value range for the online speed override factor. In some implementations, the system obtains data representing a lower bound velocity and an upper bound velocity, and computes a first-order derivative of the phase-parameterized version of the input trajectory (for a current position in the trajectory or a segment of the trajectory) with respect to real time. The system determines a permissible range by determining an upper bound value and a lower bound value for the online speed override factor. As long as the online speed override factor falls in the permissible range, the computed target velocity automatically satisfies the bounds defined by the upper bound velocity and the lower bound velocity.

Similarly, the system can determine a permissible value range for the first-order time derivative of the online speed override factor. In some implementations, the system first obtains data representing a lower bound acceleration and an upper bound acceleration, and computes a second-order derivative of the phase-parameterized version of the input trajectory with respect to real time. The system then determines a permissible range by determining an upper bound value and a lower bound value for the first-order derivative of the speed override factor. As long as the first-order time derivative of the online speed override factor falls in the permissible range, the computed target acceleration automatically satisfies the bounds defined by the upper bound acceleration and the lower bound acceleration.

In some implementations, the system determines whether the value of the online speed override factor received from the user input satisfies a predetermined criterion. The predetermined criterion can be the permissible value range for the speed override factor, as described above. In response to determining that the value of the online speed override factor does not satisfy the predetermined criterion, the system generates a notification to be displayed on a user interface indicating that the value is not acceptable. The system can further request for another value of the online speed override factor as an input. In some implementations, after determining that the received factor value does not satisfy a predetermined criterion, the system can ramp up the factor value iteratively until reaching the upper bound of the permissible range, and use the upper bound factor value to determine the target motion (e.g., including a target velocity, a target acceleration, or a target jerk).

To iteratively increase the current value of the online speed override factor to approach a user-specified value (which may be greater than the permissible limit), the system receives, for each iteration step, a current value of the online speed override factor and a current value of the first-order time derivative of the online speed override factor for the iteration step. The system determines, for the next iteration step, an updated value of the online speed override factor and an updated value of the first-order time derivative of the online speed override factor based on the current value of the online speed override factor and the current value of the first-order time derivative of the online speed override factor. The updated values approach the user-specified value while satisfying predetermined limits.

In this specification, a robot is a machine having a base position, one or more movable components, and a kinematic model that can be used to map desired positions, poses, or both in one coordinate system, e.g., Cartesian coordinates or joint angles, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method for A method comprising: initiating, by a real-time robotics control system, execution of an input trajectory for a robot at a default speed, wherein the input trajectory is a time-parameterized trajectory and specifies a path in an operating environment; before completing execution of the input trajectory, receiving a user input specifying a value of an online speed override factor; in response, generating a phase-parameterized version of the input trajectory using a phase variable; computing, on each real-time control cycle, a target velocity and a target acceleration of the phase-parameterized version of the input trajectory based on the online speed override factor; and causing the robot to transition to the target velocity and the target acceleration while traversing the path in the operating environment.

Embodiment 2 is the method of claim 1, wherein computing the target velocity and the target acceleration comprises: for a position in the input trajectory in real time, computing first and second derivatives of the position in the phase-parameterized version of the input trajectory with respect to the real time.

Embodiment 3 is the method of claim 1 or 2, wherein generating the phase-parameterized version of the input trajectory comprises: generating a sequence of piecewise continuous splines for the input trajectory, each spline being a polynomial of the phase variable.

Embodiment 4 is the method of claim 3, wherein the sequence of piecewise continuous splines are functions of a trajectory time variable, wherein the trajectory time variable is a function of the phase variable, and is equivalent to a corresponding real time when the value of the online speed override factor is set to one.

Embodiment 5 is the method of any one of claims 1-4 of, wherein the online speed override factor is a function of a first-order time derivative of the phase variable.

Embodiment 6 is the method of any one of claims 1-5, further comprising: obtaining data representing a lower bound velocity and an upper bound velocity; computing a first-order derivative of the phase-parameterized version of the input trajectory with respect to real time at a corresponding position; and determining an upper bound value and a lower bound value for the online speed override factor by ensuring that the first-order derivative of the position satisfies a range defined by the lower bound velocity and the upper bound velocity.

Embodiment 7 is the method of any one of claims 1-6, further comprising: obtaining data representing a lower bound acceleration and an upper bound acceleration; computing a second-order derivative of the position in the phase-parameterized version of the input trajectory with respect to real time; and determining an upper bound value and a lower bound value for a first-order time derivative of the online speed override factor by ensuring that the second-order derivative of the position satisfies a range defined by the lower bound acceleration and the upper bound acceleration.

Embodiment 8 is the method of any one of claims 1-7, further comprising: determining whether the value of the online speed override factor satisfies a predetermined criterion; and in response to determining that the value of the online speed override factor does not satisfy the predetermined criterion, generating a notification to be displayed on a user interface for another value of the online speed override factor.

Embodiment 9 is the method of any one of claims 1-8, further comprising: iteratively increasing a current value of the online speed override factor to approach the user-specified value of the online speed override factor without exceeding a predetermined limit for the value of the online speed override factor.

Embodiment 10 is the method of claim 9, wherein iteratively increasing the current value of the online speed override factor to approach the user-specified value of the online speed override factor comprises: for each iteration step, receiving a current value of the online speed override factor and a current value of the first-order time derivative of the online speed override factor for the iteration step; and determining, for a next iteration step, an updated value of the online speed override factor and an updated value of the first-order time derivative of the online speed override factor based on the current value of the online speed override factor and the current value of the first-order time derivative of the online speed override factor, wherein the updated values approach the user-specified value while satisfying predetermined limits.

Embodiment 11 is the method of any one of claims 1-10, wherein the value of the online speed override factor specified by the user input is applied to a single segment of the input trajectory for generating the target velocity and the target acceleration.

Embodiment 12 is the method of any one of claims 1-11, wherein the value of the online speed override factor specified by the user input is applied to a first segment of the input trajectory, and the user input further comprises a second value of the online speed override factor applied to a second segment of the input trajectory.

Embodiment 13 is a system comprising one or more computers and one or more storage devices storing instructions that when executed by one or more computers cause the one or more computers to perform respective operations of any one of claims 1-12.

Embodiment 14 is one or more non-transitory computer-readable storage media storing instructions that when executed by one or more computers cause the one or more computers to perform respective operations of any one of claims 1-12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method comprising:
   initiating, by a real-time robotics control system, execution of an input trajectory for a robot at a default speed, wherein the input trajectory is a time-parameterized trajectory and specifies a path in an operating environment;
   before completing execution of the input trajectory, receiving a user input specifying a value of an online speed override factor;
   in response, generating a phase-parameterized version of the input trajectory using a phase variable;
   computing, on each real-time control cycle, a target velocity and a target acceleration of the phase-parameterized version of the input trajectory based on the online speed override factor; and
   causing the robot to transition to the target velocity and the target acceleration while traversing the path in the operating environment.

2. The method of claim 1, wherein computing the target velocity and the target acceleration comprises:
   for a position in the input trajectory in real time, computing first and second derivatives of the position in the phase-parameterized version of the input trajectory with respect to the real time.

3. The method of claim 1, wherein generating the phase-parameterized version of the input trajectory comprises:
   generating a sequence of piecewise continuous splines for the input trajectory, each spline being a polynomial of the phase variable.

4. The method of claim 3, wherein the sequence of piecewise continuous splines are functions of a trajectory time variable, wherein the trajectory time variable is a function of the phase variable, and is equivalent to a corresponding real time when the value of the online speed override factor is set to one.

5. The method of claim 1, wherein the online speed override factor is a function of a first-order time derivative of the phase variable.

6. The method of claim 1, further comprising:
   obtaining data representing a lower bound velocity and an upper bound velocity;
   computing a first-order derivative of the phase-parameterized version of the input trajectory with respect to real time at a corresponding position; and
   determining an upper bound value and a lower bound value for the online speed override factor by ensuring that the first-order derivative of the position satisfies a range defined by the lower bound velocity and the upper bound velocity.

7. The method of claim 1, further comprising:
   obtaining data representing a lower bound acceleration and an upper bound acceleration;
   computing a second-order derivative of the position in the phase-parameterized version of the input trajectory with respect to real time; and
   determining an upper bound value and a lower bound value for a first-order time derivative of the online speed override factor by ensuring that the second-order derivative of the position satisfies a range defined by the lower bound acceleration and the upper bound acceleration.

8. The method of claim 1, further comprising:
   determining whether the value of the online speed override factor satisfies a predetermined criterion; and in response to determining that the value of the online speed override factor does not satisfy the predetermined criterion, generating a notification to be displayed on a user interface for another value of the online speed override factor.

9. The method of claim 1, further comprising:
iteratively increasing a current value of the online speed override factor to approach the user-specified value of the online speed override factor without exceeding a predetermined limit for the value of the online speed override factor.

10. The method of claim 9, wherein iteratively increasing the current value of the online speed override factor to approach the user-specified value of the online speed override factor comprises:
for each iteration step, receiving a current value of the online speed override factor and a current value of the first-order time derivative of the online speed override factor for the iteration step; and
determining, for a next iteration step, an updated value of the online speed override factor and an updated value of the first-order time derivative of the online speed override factor based on the current value of the online speed override factor and the current value of the first-order time derivative of the online speed override factor, wherein the updated values approach the user-specified value while satisfying predetermined limits.

11. The method of claim 1, wherein the value of the online speed override factor specified by the user input is applied to a single segment of the input trajectory for generating the target velocity and the target acceleration.

12. The method of claim 1, wherein the value of the online speed override factor specified by the user input is applied to a first segment of the input trajectory, and the user input further comprises a second value of the online speed override factor applied to a second segment of the input trajectory.

13. A system comprising one or more computers and one or more storage devices storing instructions that when executed by one or more computers cause the one or more computers to perform respective operations, the operations comprising:
initiating, by a real-time robotics control system, execution of an input trajectory for a robot at a default speed, wherein the input trajectory is a time-parameterized trajectory and specifies a path in an operating environment;
before completing execution of the input trajectory, receiving a user input specifying a value of an online speed override factor;
in response, generating a phase-parameterized version of the input trajectory using a phase variable;
computing, on each real-time control cycle, a target velocity and a target acceleration of the phase-parameterized version of the input trajectory based on the online speed override factor; and
causing the robot to transition to the target velocity and the target acceleration while traversing the path in the operating environment.

14. The system of claim 13, wherein computing the target velocity and the target acceleration comprises:
for a position in the input trajectory in real time, computing first and second derivatives of the position in the phase-parameterized version of the input trajectory with respect to the real time.

15. The system of claim 13, wherein generating the phase-parameterized version of the input trajectory comprises:
generating a sequence of piecewise continuous splines for the input trajectory, each spline being a polynomial of the phase variable.

16. The system of claim 15, wherein the sequence of piecewise continuous splines are functions of a trajectory time variable, wherein the trajectory time variable is a function of the phase variable, and is equivalent to a corresponding real time when the value of the online speed override factor is set to one.

17. One or more non-transitory computer-readable storage media storing instructions that when executed by one or more computers cause the one or more computers to perform respective operations, the respective operations comprising:
initiating, by a real-time robotics control system, execution of an input trajectory for a robot at a default speed, wherein the input trajectory is a time-parameterized trajectory and specifies a path in an operating environment;
before completing execution of the input trajectory, receiving a user input specifying a value of an online speed override factor;
in response, generating a phase-parameterized version of the input trajectory using a phase variable;
computing, on each real-time control cycle, a target velocity and a target acceleration of the phase-parameterized version of the input trajectory based on the online speed override factor; and
causing the robot to transition to the target velocity and the target acceleration while traversing the path in the operating environment.

18. The one or more non-transitory computer-readable storage media of claim 17, wherein computing the target velocity and the target acceleration comprises:
for a position in the input trajectory in real time, computing first and second derivatives of the position in the phase-parameterized version of the input trajectory with respect to the real time.

19. The one or more non-transitory computer-readable storage media of claim 17, wherein generating the phase-parameterized version of the input trajectory comprises:
generating a sequence of piecewise continuous splines for the input trajectory, each spline being a polynomial of the phase variable.

20. The one or more non-transitory computer-readable storage media of claim 19, wherein the sequence of piecewise continuous splines are functions of a trajectory time variable, wherein the trajectory time variable is a function of the phase variable, and is equivalent to a corresponding real time when the value of the online speed override factor is set to one.

* * * * *